Feb. 5, 1935.  H. SCHÜSTER  1,990,138
MEASURING DEVICE FOR TUBE WALLS
Filed Jan. 18, 1934  2 Sheets-Sheet 2
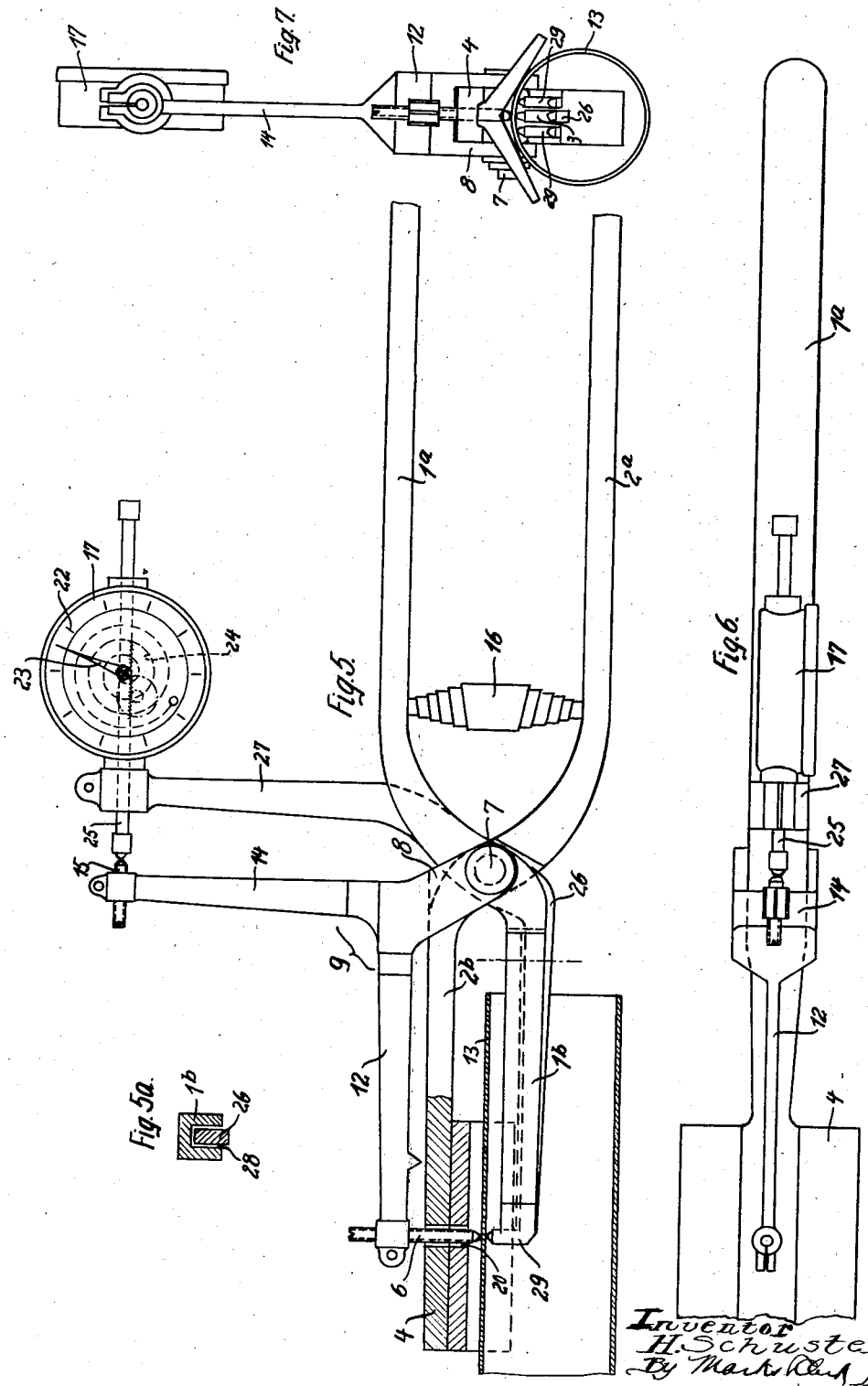

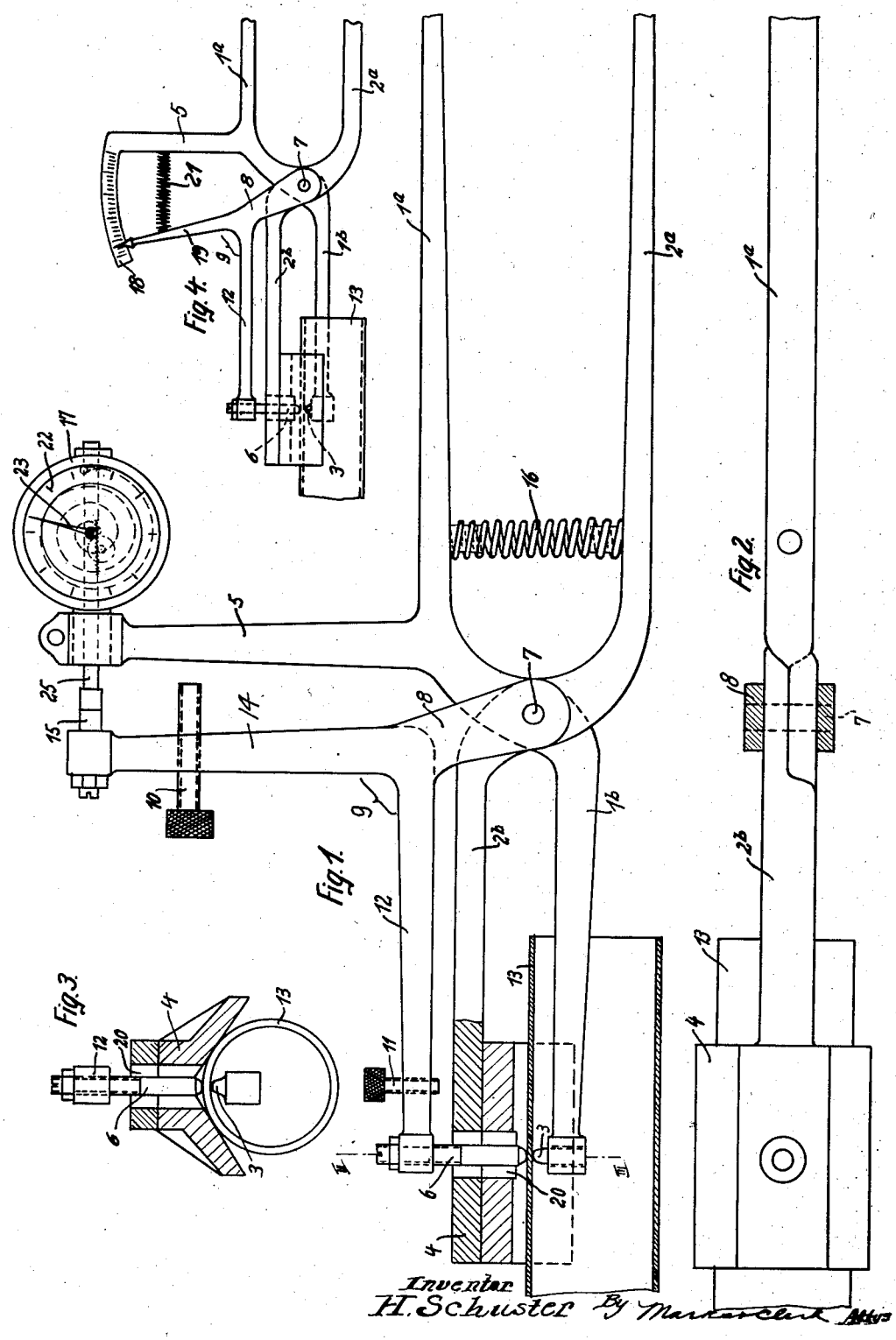

UNITED STATES PATENT OFFICE 1,990,138

MEASURING DEVICE FOR TUBE WALLS

Hans Schüster, Immigrath (Ndrh.), Germany

Application January 18, 1934, Serial No. 707,191
In Germany October 3, 1932

6 Claims. (Cl. 33—148)

This invention relates to a tongs-like tool for measuring the thickness of the walls of tubes. The advantage obtainable by this improved tool of the type stated over measuring tools of the known similar kinds resides therein that means are provided to secure the accurate vertical position of the measuring pins with respect to one another whereby the accuracy of the measurement is warranted. For this purpose that leg of the tongs-like tool which enters into the tube is provided at its end with a measuring pin and the other leg which remains outside the tube is provided at its end with an angular member which contacts with the outer wall of the tube, whereas the outer measuring pin extends freely through said angular member and is attached to one leg of a bell-crank lever which is turnable on the bolt connecting the two legs of the tongs with one another, the other leg of said bell-crank lever transmitting the measured tube wall thickness to a graduated scale attached to an arm projecting forth from one of the tongs legs.

The invention is illustrated diagrammatically and by way of example on the accompanying drawings on which Figure 1 is chiefly a side-view of, and partly a longitudinal section through, a tongs-like tube wall measuring tool designed according to this invention, the tool being shown in its position on the tube, and the tube concerned being shown in axial section. Figure 2 is an upper view of the tool, the bell-crank lever proper (9, Fig. 1) and the graduated scale (17, Fig. 1) with the arm supporting it 5, (Fig. 1) being left away. Figure 3 is a transverse section in the plane III—III of Fig. 1. Figure 4 is a side-view of another constructional form drawn to a reduced scale, and the grip portions of the tongs-legs being broken off. Figure 5 is a view similar to Fig. 1 and shows another modification, some parts at the left-hand end of the figure being drawn in section. Figure 5ª shows a transverse section through the inner measuring arm ($1^b$) of Fig. 5. Figure 6 is an upper view of the complete tool, and Figure 7 is a front-view of the complete tool, seen in the direction from the front-end to the rear or grip end of the same.

Referring to the constructional form shown in Figs. 1–3, $1^a$ denotes the grip leg of one half of the tool, $1^b$ is the measuring leg of the same half, $2^a$ is the grip leg of the other half of the tool, and $2^b$ is the operating leg of this half; the two halves are connected with one another by the pin or bolt 7. Between the grip legs is a helical compression spring 16 which tends continually to keep these legs apart. At the free end of the measuring leg $1^b$ is the measuring pin 3 which contacts with the inner wall of the tube 13, and to the free end of the leg $2^b$ is attached an angular member 4. From the grip leg $1^a$ extends forth, at right angles with respect to the same, an arm 5, to the end of which is attached the indicating device 17 that is provided with a graduated scale 22 and a pointer 23 which is under the control of a bolt 25 that is longitudinally shiftable in the free end of the arm 5. The free end of said bolt is designed as a rack (not shown) which meshes with a pinion connected with said pointer. The bolt 25 is slightly enlarged at its outer end and this enlarged end is held in contact with an abutment member 15 by means of a helical spring located inside the casing 17 of the indicating device, as shown in dotted lines in Fig. 1.

12 and 14 are the two arms of the bell-crank lever 9, from the middle portion of which extends forth a forked arm 8, by means of which the bell-crank lever is hinged to the tongs, as shown. The before-mentioned abutment member 15 is attached to the free end of the arm 14 of said bell-crank lever, and in the same arm is an adjusting screw 10. The free end of the arm 12 of the bell-crank lever is provided with the outer measuring pin 6, and in the same arm is an adjusting screw 11. The pin 6 extends freely through an aperture 20 of the angular member 4. The adjusting screws 10 and 11 serve for limiting the magnitude of the angular motion of the bell-crank lever legs.

Normally, when not in use, the tongs are kept open by the spring 16. When the legs $1^b$ and $2^b$ have been shoved onto the open end of the tube, the legs $1^a$ and $2^a$ are moved towards one another until the measuring pins 3 and 6 contact with the inner and the outer surface of the tube wall. Owing to the angular shape of the member 4, the tube 13 is securely located in the angle of said member, and therefore also the position of the two measuring pins is practically a positive one so that both stand correctly radially with respect to the tube. As the members 25, 15, 14 and 12 are subjected to the pressure of the spring in the casing 17, the measuring pin 6 is pressed yieldingly against the outer wall of the tube, and according to the thickness of the tube wall, the shiftable bolt 25 is moved out of the casing 17 in which it turns the pointer 23 correspondingly so as to indicate the thickness of the wall upon the scale 22.

Apart from the accuracy of the measurement, other advantages consist in the convenient manipulation of the tool, and in the possibility of measuring the wall thickness at a certain distance from the end of the respective tube.

In the modification shown in Fig. 4 the graduated scale is provided not at a casing like 17 in Fig. 1, but on a circularly curved lateral extension 18 of the arm 5. The bell-crank lever arm 14 of Fig. 1 is in this case (Fig. 4) transformed into a pointer 19 which cooperates with the scale 18. A helical compressive spring 21 arranged between the arm 5 and the pointer 19 presses the measuring pin 6 against the outer surface of the tube wall. This spring is a substitute for the spiral spring in the casing 17 of Fig. 1. The manipulation and manner of action of this modification is the same as in Figs. 1–3.

In the further modification shown in Figs. 5–7, the lower measuring pin is attached not to the tongs leg 1b but to a separate leg or arm 26 of a bell-crank lever 26, 27 which is supported on the pivot 7 of the tongs that connects the tongs halves with one another, as in Fig. 1. The leg 1b is designed as an inverted channel (Fig. 5a) and the lever arm 26 is located in this channel. The other arm (27) of the bell-crank lever 26, 27 is a movable substitute for the immovable arm 5 of Fig. 1 and carries the indicating device 17, 22, 23 which is the same as that in Fig. 1. At the free end of the tongs leg 1b are two feeling members 29 (Fig. 7) which are directed towards the inner wall of the tube (13) and contact therewith when the device is in its operative position, as in Fig. 5. The lower or inner measuring pin 3 is located between said feeling members 29. The position of the pin 3 determines, of course, the position of the members 26 and 27, as well as of the entire indicating device (17, 22, 23). The manipulation and manner of action of this modification is practically just the same as in Figs. 1 and 4. It is obviously superfluous to enter into further or particular details in these respects.

I claim:

1. A tongs-like device for measuring the thickness of tube walls, comprising, in combination with a tongs-like body having two grip legs and two operating legs, a measuring pin associated with the end of one of said operating legs, an angular member located at the end of the other operating leg and having its cavity located opposite said measuring pin and having, besides, an aperture in its middle portion; another measuring pin extending freely through said aperture; a bell-crank lever hinged to the connecting pivot of the tongs legs, one of the arms of this lever extending over said angular member and having said other measuring pin attached to it; an indicating device so arranged relatively to the other arm of said bell-crank lever as to be adapted to be actuated by the movements of the same, and means for supporting said indicating device.

2. A tongs-like device for measuring the thickness of tube walls, comprising, in combination with a tongs-like body having two grip legs and two operating legs, a measuring pin located at the end of one of said operating legs, an angular member located at the end of the other of said operating legs and having its cavity located opposite said measuring pin and having, besides, an aperture in its middle portion; another measuring pin extending freely through said aperture; a bell-crank lever hinged to the connecting pivot of the tongs legs, one of the arms of this lever extending over said angular member and having said other measuring pin attached to it; the other arm extending substantially at right angles away from the tongs body; another arm extending substantially parallel to said last-mentioned bell-crank lever arm away from the said body; an indicating device attached to the end of said parallel extending arm, and means for transmitting the movements of the said other bell-crank lever arm to said indicating device.

3. A tongs-like device for measuring the thickness of tube walls, comprising, in combination with a tongs-like body having two grip legs and two operating legs, a measuring pin located at the end of said operating legs, an angular member located at the end of the other operating legs and having its cavity located opposite said measuring pin and having, besides, an aperture in its middle portion; another measuring pin extending freely through said aperture; a bell-crank lever hinged to the connecting pivot of the tongs legs, one of the arms of this lever extending over said angular member and having said other measuring pin attached to it; an indicating device comprising a circularly curved graduated scale and a rotary pointer, an axially shiftable bolt, and means for transmitting the movements of said bolt to said pointer, said indicating device being so arranged relatively to the other arm of said bell-crank lever that its shiftable bolt is adapted to be actuated by the same, and means for supporting said indicating device.

4. A tongs-like device for measuring the thickness of tube walls, comprising, in combination with a tongs-like body having two grip legs and two operating legs, a measuring pin located at the end of one of said operating legs, an angular member located at the end of the other of said operating legs and having its cavity located opposite said measuring pin and having, besides, an aperture in its middle portion; another measuring pin extending freely through said aperture; a bell-crank lever hinged to the connecting pivot of the tongs legs, one of the arms of this lever extending over said angular member and having said other measuring pin attached to it, and the middle portion of said bell-crank lever being designed as a fork having the tongs body supported between its legs; the bell-crank lever and the tongs body being jointed to one another by a common pivot; an indicating device so arranged relatively to the other arm of said bell-crank lever as to be adapted to be actuated by the movements of the same, and means for supporting said indicating device.

5. A tongs-like device for measuring the thickness of tube walls, comprising, in combination with a tongs-like body having two grip legs and two operating legs, a measuring pin located at the end of one of said operating legs, an angular member located at the end of the other of said operating legs and having its cavity located opposite said measuring pin and having, besides, an aperture in its middle portion; another measuring pin extending freely through said aperture; a bell-crank lever hinged to the connecting pivot of the tongs legs, one of the arms of this lever extending over said angular member and having said other measuring pin attached to it; the other arm extending substantially at right angles away from the tongs body; another arm extending substantially parallel to said last-mentioned bell-crank lever arm away from the said body; an indicating device attached to the end of said parallel extending arm; a shiftable bolt supported in the end of the said parallel extending arm and extending into said indicating device and being adapted to transmit motion to the movable indicating member of said device; a spring tending to shove said bolt outwardly towards the end of said other bell-crank lever arm, and an abutment member at said lever arm end opposite said shiftable bolt.

6. A tongs-like device for measuring the thickness of tube walls, comprising, in combination with a tongs-like body having two grip legs and two operating legs of which that which is to be the inner one during work is channel-shaped in section; a pivot holding the body halves together, an angular member attached to that operating leg which is to be the outer one during work; said member having an aperture in its middle portion; a bell-crank lever supported on said pivot and having one of its arms extending over said angular member; a measuring pin attached to the end of this arm and extending through said aperture; another bell-crank lever also supported on the said pivot and having one of its arms extending along in said channel; a measuring pin also at the end of this arm; the other arms of both bell-crank lever extending away from the tongs body substantially parallel to one another; a measuring device attached to one of these other arms, and means for transmitting the movements of the other of these arms to said measuring device.

HANS SCHÜSTER.